United States Patent
Hamilton et al.

(10) Patent No.: US 6,843,157 B2
(45) Date of Patent: Jan. 18, 2005

(54) SEVERING VEHICLE BATTERY CABLE

(75) Inventors: Brian K. Hamilton, Ogden, UT (US); Brent A. Parks, Englewood, CO (US); Dario G. Brisighella, Mendon, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/172,062

(22) Filed: Jun. 13, 2002

(65) Prior Publication Data

US 2003/0230177 A1 Dec. 18, 2003

(51) Int. Cl.$^7$ ................................................. B26D 1/04
(52) U.S. Cl. ..................... 83/639.4; 83/950; 200/61.08; 307/10.7
(58) Field of Search ................ 83/639.4, 950; 307/10.7; 200/61.08

(56) References Cited

U.S. PATENT DOCUMENTS

| | | | |
|---|---|---|---|
| 3,246,396 A | * 4/1966 | Temple | 30/277 |
| 3,452,631 A | * 7/1969 | Brizzolara | 83/444 |
| 3,482,484 A | * 12/1969 | Brizzolara | 89/1.1 |
| 3,763,738 A | * 10/1973 | Temple | 89/1.14 |
| 3,842,228 A | 10/1974 | Green | 200/151 |
| 3,886,484 A | * 5/1975 | Sturgis | 83/580 |
| 3,895,552 A | * 7/1975 | Lagofun | 83/580 |
| 3,915,043 A | * 10/1975 | Smith et al. | 83/362 |
| 4,062,112 A | * 12/1977 | Lake | 30/228 |
| 4,149,093 A | 4/1979 | D'Alessio et al. | 307/10 |
| 4,224,487 A | 9/1980 | Simonsen | 200/61.08 |
| 4,902,956 A | 2/1990 | Sloan | 320/13 |
| 5,293,147 A | 3/1994 | Oh et al. | 337/227 |
| 5,535,842 A | 7/1996 | Richter et al. | 180/279 |
| 5,574,316 A | 11/1996 | Nieschulz | 307/10.7 |
| 5,621,197 A | 4/1997 | Bender et al. | 200/61.08 |
| 5,818,121 A | 10/1998 | Krappel et al. | 307/10.7 |
| 5,818,122 A | 10/1998 | Miyazawa et al. | 307/10.7 |
| 5,877,563 A | 3/1999 | Krappel et al. | 307/10.1 |
| 5,990,572 A | 11/1999 | Yasukuni et al. | 307/10.1 |
| 6,000,311 A | * 12/1999 | Katoh et al. | 83/639.4 |
| 6,020,656 A | 2/2000 | Fildan | 307/10.7 |
| 6,049,140 A | 4/2000 | Alksnat et al. | 307/10.2 |
| 6,078,108 A | 6/2000 | Fröschl | 307/10.7 |
| 6,111,327 A | 8/2000 | Bae | 307/10.7 |
| 6,157,288 A | 12/2000 | Yamaguchi | 337/405 |
| 6,166,454 A | 12/2000 | Schaller et al. | 307/10.1 |
| 6,222,439 B1 | 4/2001 | Tanigawa et al. | 337/401 |
| 6,232,568 B1 | 5/2001 | Hasegawa et al. | 200/61.08 |
| 6,252,190 B1 | 6/2001 | Niemeyer | 218/1 |
| 6,275,136 B1 | 8/2001 | Yamaguchi | 337/401 |
| 6,281,781 B1 | 8/2001 | Yamaguchi | 337/401 |
| 6,281,782 B1 | 8/2001 | Morimoto et al. | 337/401 |
| 6,333,568 B1 | 12/2001 | Bitsche et al. | 307/10.1 |
| 6,349,474 B1 | 2/2002 | Jordan | 30/228 |

FOREIGN PATENT DOCUMENTS

WO    WO 00/13832    3/2000

OTHER PUBLICATIONS

First Technology Safety Systems, Inc., Battery Cut–Off Specification Sheet, 2 pages, undated.

* cited by examiner

*Primary Examiner*—Kenneth E. Peterson
(74) *Attorney, Agent, or Firm*—Sheridan Ross P.C.

(57) ABSTRACT

A severing apparatus for use with a battery cable is provided. The severing apparatus includes a housing that holds an initiator and a severing element. The battery cable is located through a lateral bore formed in the housing. The severing element is disposed on one side of the battery cable. A deformable blocker can be disposed on the opposite side of the battery cable. When it is desired to sever the battery cable and thereby discontinue the supplying of electrical power by the battery, such as when a predetermined vehicle collision occurs, the initiator is triggered and causes the severing element to move. Movement of the severing element removes a severed battery cable segment. Movement of the severing element and the severed battery cable segment is stopped using the blocker when present. The blocker can be part of a shell that surrounds the housing. Alternatively, the blocker can be held in the housing.

8 Claims, 4 Drawing Sheets

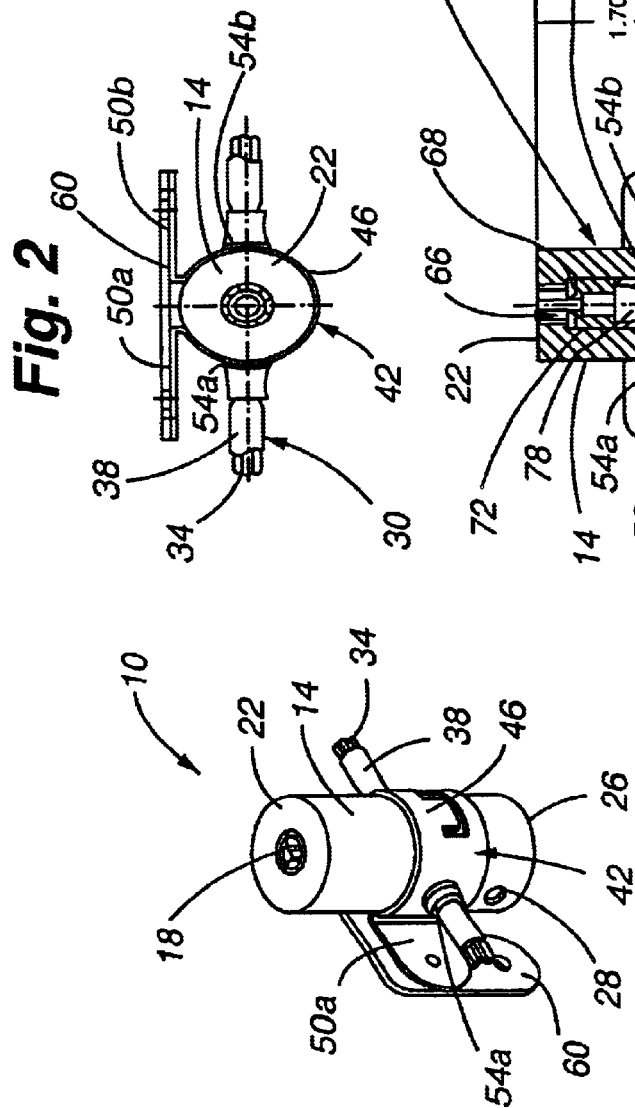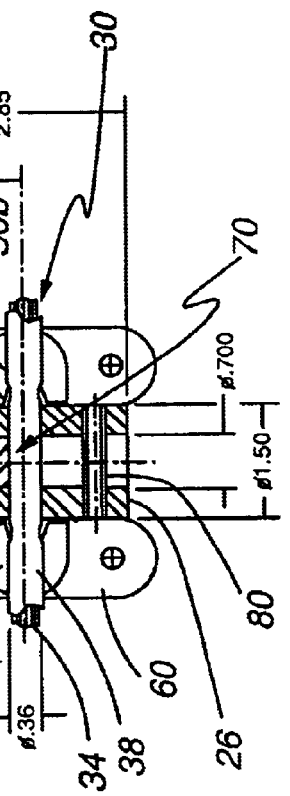

SEVERING VEHICLE BATTERY CABLE

FIELD OF THE INVENTION

The present invention relates to controlling a battery electrical connection in a vehicle and, in particular, disconnecting the battery electrical connection when a predetermined vehicle impact occurs.

BACKGROUND OF THE INVENTION

When a vehicle is involved in a crash or collision, it is desirable to initiate appropriate procedures that will safeguard the vehicle occupants and reduce detrimental results from such a collision. One of the worthwhile measures that can be taken relates to removing electrical power to at least substantially all components in the vehicle. Uncontrolled electrical power can act as a source of harm and damage to the vehicle occupants and the vehicle itself. For example, continued supplying of electrical power to one or more vehicle components after a collision can constitute a substantial fire hazard that can lead to highly damaging, even catastrophic, results. Unwanted continued electrical power can also result in inadvertent deployment of undeployed restraint devices while emergency personnel are attempting rescue operations.

With regard to removing, or at least substantially reducing, immediate potential of harm caused by the source of electrical power, devices have been advanced directed to removing electrical power when the vehicle impact occurs. In one known way, the electrical power is discontinued by interrupting the electrical connection from/to the vehicle battery. Once electrical continuity is removed between the vehicle battery and components powered by the battery, the risks associated with potentially uncontrolled electrical power are substantially reduced. This known device interrupts power at the battery terminal where hardware thereof is joined to a battery post. The hardware includes a squib that is controllably activated when one or more defined conditions occur, such as a predetermined threshold related to a vehicle collision being exceeded. When the squib is triggered, a disconnect results between the battery terminal clamp and the battery cable.

Although hardware has been previously devised for terminating the supplying of battery power in a vehicle, it would be beneficial to provide a battery cable severing apparatus and method that is easy to make, assemble and install, has a reduced number of parts, operates effectively and reliably and is made at low cost. Additionally, such an apparatus must not create an additional hazard, such as producing a flame or shrapnel, as well as be able to withstand the under hood environment in a vehicle and have a long life.

SUMMARY OF THE INVENTION

In accordance with the present invention, a severing apparatus is provided that includes a housing that has a first bore and a second bore. The first bore can be in a substantially longitudinal direction and the second bore can be in a substantially lateral direction. Positioned within the longitudinal bore is an initiator and a severing element or piston that is caused to move when the initiator is triggered. Positioned within the lateral bore are portions of the battery cable that is to be cut by the severing element. The severing element is located between the battery cable portions and the initiator. In one embodiment, the severing apparatus can also include a blocker that is disposed on the side of the battery cable portions opposite from the side on which the severing element is disposed. The blocker functions to control movement of the severing element after it has cut the battery cable. In one embodiment, the blocker can be part of a container or sleeve that is located about the outer surface of the housing. In particular, the blocker can include portions that are more adjacent the end towards which the severing element moves, when the apparatus is activated, than to the opposite end of the apparatus. The blocker may be essentially end portions of the container. In another embodiment, where there is no container, the blocker may be held to the housing adjacent end portions that are opposite from the end portions of the housing that are adjacent to the initiator. Preferably, in both embodiments, at least some outer portions of the severing element are electrically insulative and, more preferably, the severing element is made of a substantially non-metallic material or at least a majority of the volume of the severing element is made of a non-metallic material, which will essentially or practically survive the shock loading of the initiator at all temperatures of interest.

When the severing apparatus is activated to cut the battery cable portions, the initiator is triggered. Typically, the initiator is triggered by sensing a predetermined vehicle event, such as a predetermined threshold associated with a vehicle crash or collision. Such sensing generates an electrical signal that is applied to the initiator. An initiator charge of the initiator ignites and generates a force that causes the severing element adjacent thereto to move in the longitudinal bore. During this movement, the severing element passes through and cuts and separates a segment or portions of the battery cable from remaining portions. Continued movement of the severing element with the severed cable segment subsequently results in contact with the blocker. Engagement by the blocker of the severed cable segment under the force associated with the severing element causes at least portions of the blocker to deform as it stops further movement of the severed cable segment and the severing element. In a preferred embodiment, at least portions of the severing element occupy portions of the space previously occupied by the severed cable segment before it was cut from remaining portions of the battery cable.

With the removal of the severed cable segment, a discontinuity exists in the battery cable so that electrical power and electrical current can no longer be carried by the battery cable. Consequently, vehicle components served by electrical power from the battery having the severed cable segment no longer receive the necessary battery power for them to properly operate. Thus, any potential damage or danger due to the existence of electrical power from such a battery is essentially eliminated or at least substantially reduced.

Based on the foregoing summary, a number of advantages of the present invention are readily discerned. The apparatus of the present invention reduces or eliminates potential hazards due to electrical power after a vehicle collision. The apparatus is reliably activated using an initiator in which a control signal triggers the initiator charge. The apparatus causes portions of the battery cable to be severed thereby removing electrical continuity in the battery cable. The severing element and the severed cable segment are efficiently and effectively captured. A blocker can be included and is designed to deform in achieving the desired capture. The severing apparatus is compact, has a few parts, is relatively easy to connect to the battery cable and is inexpensive.

Additional advantages of the present invention will become readily apparent from the following discussion, particularly when taken together with the accompanying drawings.

BRIEF DESCRIPTION OF THE DRAWINGS

FIG. 1 is a perspective view of a severing apparatus of the present invention together with hardware for use in connecting the apparatus to the vehicle;

FIG. 2 is a top view of the severing apparatus of FIG. 1;

FIG. 3 is a longitudinal section of the apparatus of FIG. 1;

DETAILED DESCRIPTION

Figure 4:
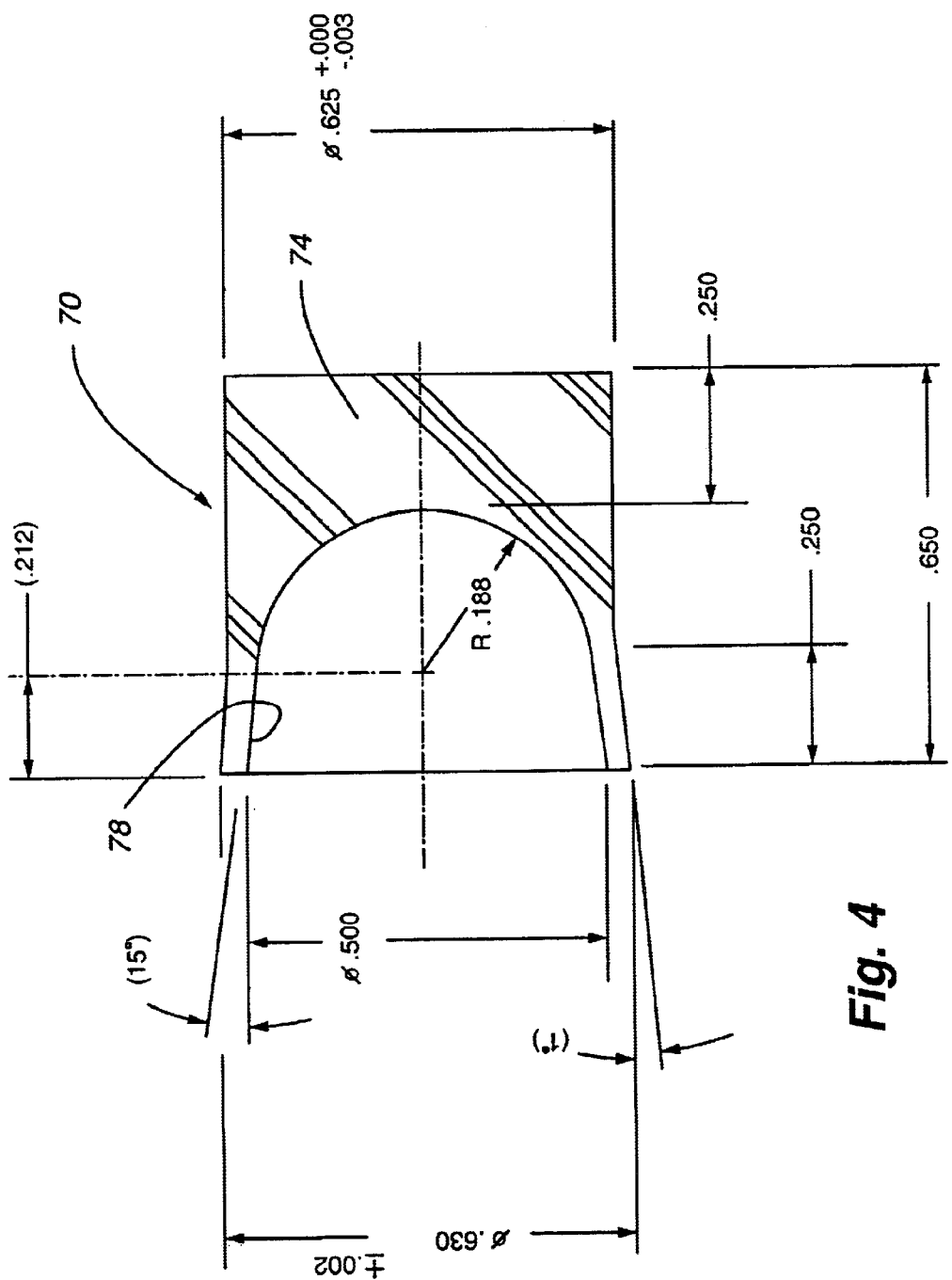
FIG. 4 is a section of the severing element.

With reference to FIGS. 1 and 2, a severing apparatus 10 is illustrated. The severing apparatus 10 includes a generally cylindrical housing 14 having a longitudinal bore 18 that extends throughout the length of the housing 14. At least a majority of the volume of the housing 14 is made of a non-metallic material. In a preferred embodiment, all or substantially all, of the housing is made from a glass filled nylon. The longitudinal bore 18 extends from a first end 22 of the housing 14 to a second end 26 thereof. In this embodiment, a lateral opening 28 is formed in the housing 14 spaced from, but adjacent to, the second end 26. The lateral opening 28 extends in a linear, lateral direction perpendicular to the direction of the longitudinal bore 18 to thereby form receiving spaces in the walls of the housing 14. Formed intermediate the lateral opening 28 and the first end 22 of the housing is a lateral bore that also extends normal to the longitudinal bore 18. The lateral bore formed through the walls in the housing 14 define areas in the walls through which the battery cable or electrical connection 30 can be positioned. That is, a section of the battery cable 30 is located within the outer cylindrical wall of the housing 14 and is integral or continuous with battery cable sections that extend outwardly from both sides of the lateral bore. The battery cable 30 includes a number of strands of battery conductors 34 and an insulating jacket 38 that surrounds the battery conductors 34.

With regard to holding or otherwise supporting the severing apparatus 10 in a suitable position in the vehicle, a fastening unit 42 can be used to surround at least portions of the outer surface or wall of the housing 14, preferably a desired distance below the first end 22 and above the lateral opening 28. The fastener unit 42 includes a connector body 46 and a pair of wings 50a, 50b. Sleeve-like elements 54a, 54b extend from the connector body 46 at the lateral bore where the cable sections extend from the housing 14. With respect to the desired supporting or holding of the severing apparatus 10, a bracket 60 can be joined to the wings 50a, 50b. The bracket 60 is fastened to, or otherwise connected to, a part in the vehicle.

With reference to FIG. 3, the severing apparatus 10 includes an initiator 66 that, when activated, generates a suitable force. The desired initiator 66 is described in U.S. Pat. No. 6,073,963 and includes a molded metal insert 68 that is molded to remaining portions of the initiator 66 using mold material 72. The insert 68 is required in preventing escape of the initiator 66, after its activation, from the housing 14. The initiator 66 has one or more electrical pins for receiving an electrical signal related to the detection of the predetermined event, such as a threshold related to a vehicle collision. The initiator 66 is disposed in the longitudinal bore 18 adjacent to the first end 22 of the housing 14. At this location, the one or more electrical pins are readily accessible for accomplishing a desired electrical connection, using electrical conducting wires, to the collision detector or comparable controller.

Disposed inwardly of the initiator 66 in the longitudinal bore 18 and between the initiator 66 and the section of the battery cable 30 located within the housing 14 is a cutter or severing element 70. As also seen in FIG. 4, severing element 70 has a body 74 and a cavity 78. The severing element 70 is essentially, or essentially acts like, a piston in moving in the longitudinal bore 18 upon activation of the initiator 66. At least a majority of the volume of the severing element body 74 is made of one or more non-metallic materials. In the preferred embodiment, all or substantially all, of the severing element body 74 is made from a fiber reinforced plastic material, such as PEEK. The severing element cavity 78 is aligned with the end portions of the initiator 66. Consequently, when the initiator 66 is activated, the initiator charge of the initiator 66 is ignited creating an explosive force applied to the surface of the severing element body 74, which can be defined as the boundary between the cavity 78 and the severing element body 74. This force generated by the activation of the initiator 66 causes the severing element 70 to move in the longitudinal bore 18 in a direction away from the initiator 66 and in the direction that severs the section of the battery cable 30 located within the longitudinal bore 18.

With regard to locating the severing element 70 in the longitudinal bore 18 of the housing 14, the housing wall can be made relatively thick and the severing element 70 can be appropriately dimensioned so that it is essentially maintained in a desired position before activation, in the longitudinal bore 18 relative to the battery cable 30. In that regard, the severing element 70 is essentially press fit to be suitably held in position. Regarding the preferred plastic housing 14, it can be readily and inexpensively made by a conventional molding process, including the formation of the lateral opening 28 and the lateral bore. Similarly, the severing element 70 could be made relatively inexpensively by a conventional manufacturing process, such as injection molding or machining.

As also illustrated in FIG. 3, the severing apparatus 10 can also include a blocker 80, such as a deformable tube, that extends, like the battery cable 30, in a lateral direction perpendicular to the longitudinal bore 18. The ends of the blocker 80 are seated in the receiving spaces formed in the cylindrical wall of the housing 14 and which also define portions of the lateral opening 28. The blocker 80 can be spaced a sufficient distance from the second end 26 of the housing 14 so that, preferably, when it deforms during operation of the severing apparatus 10, all or substantially all portions of the blocker 80 remain within the housing 14. In that regard, the blocker 80 is made of a material that deforms or "gives" upon being contacted by the severing element 70. The blocker 80 functions to gradually slow and halt movement of the severing element 70 and the severed portion of the cable during operation of the severing apparatus 10.

Figure 5:
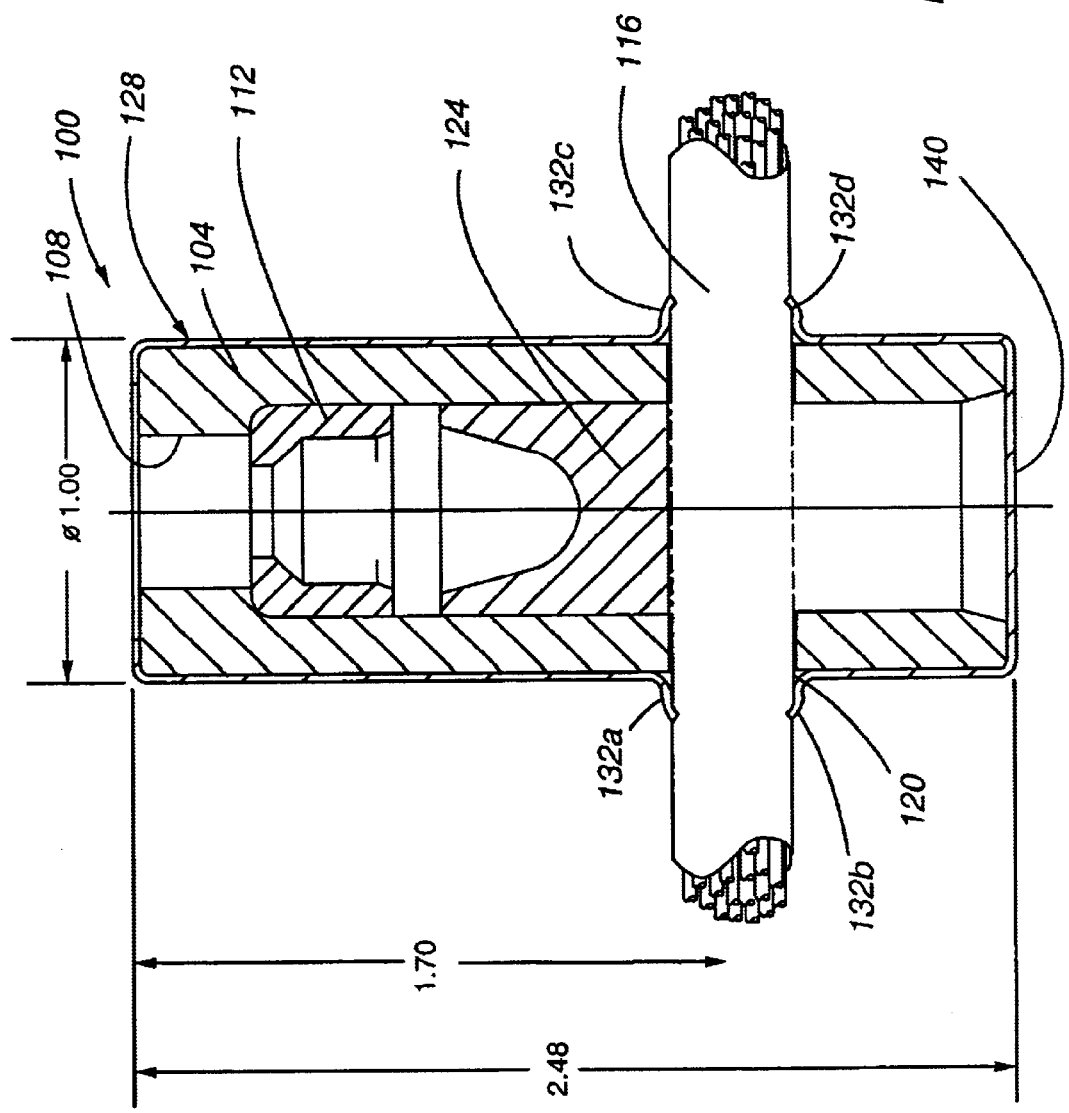
FIG. 5 is a longitudinal section of another embodiment of the severing apparatus in which the blocker includes end portions of a container.

Referring to FIG. 5, another and more preferred embodiment of a severing apparatus is illustrated that is similar in respects to the embodiment of FIGS. 1–4. In this preferred embodiment, the severing apparatus 100 includes a housing 104 having a first bore 108 that extends in a longitudinal direction. A molded collar 112 is disposed within this longitudinal bore 108. The molded collar 112 is shaped to receive and hold an initiator (preferably, the initiator with the molded insert) that will be used to generate the force for severing the battery cable 116. The battery cable 116 is located in a second bore 120 that can extend in a substantially lateral direction. This lateral bore 120 includes openings formed in the housing 104. The battery cable 116 has portions or a section disposed within the walls of the housing 104 and aligned with a severing element or piston 120.

In this embodiment, and also not found in the previously described embodiment, is a container or shell 128 that may be made of metal and is positioned outwardly of and in contact with the housing 104. Adjacent to the battery cable 116, the container 128 has crimped parts 132a–132d. These are formed by openings created in the container 128 adjacent the lateral bore 120 and the battery cable 116. Provided on the opposite side of the battery cable 116 from the severing element 124 is a blocker 140. In this embodiment, the blocker is a part of the container 128, preferably portions thereof that are located outwardly of the end portions of the housing 104. The blocker 140 is of a size and shape and made of a material that allows it to be deformed or change due to the action of the severing element 124 when the severing apparatus 100 is activated.

Figure 6:
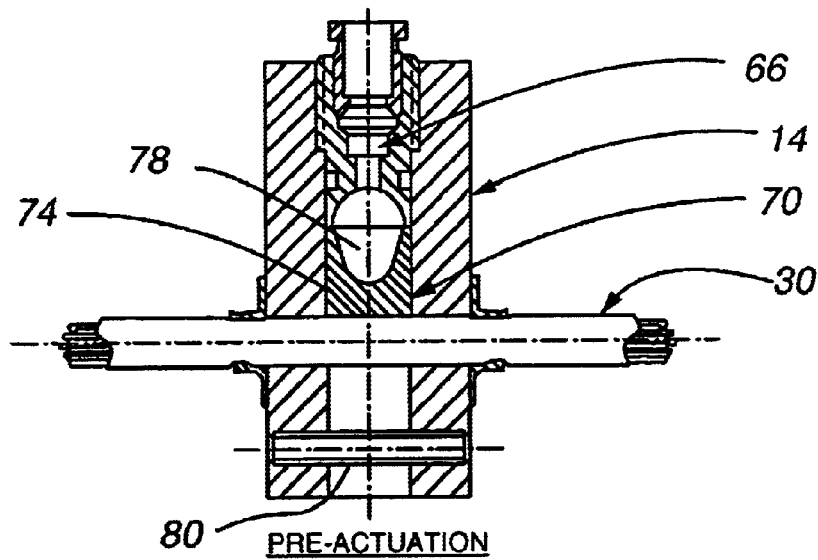
FIG. 6 is a longitudinal section, similar to FIG. 3, illustrating the severing apparatus before it is actuated.
Figure 7:
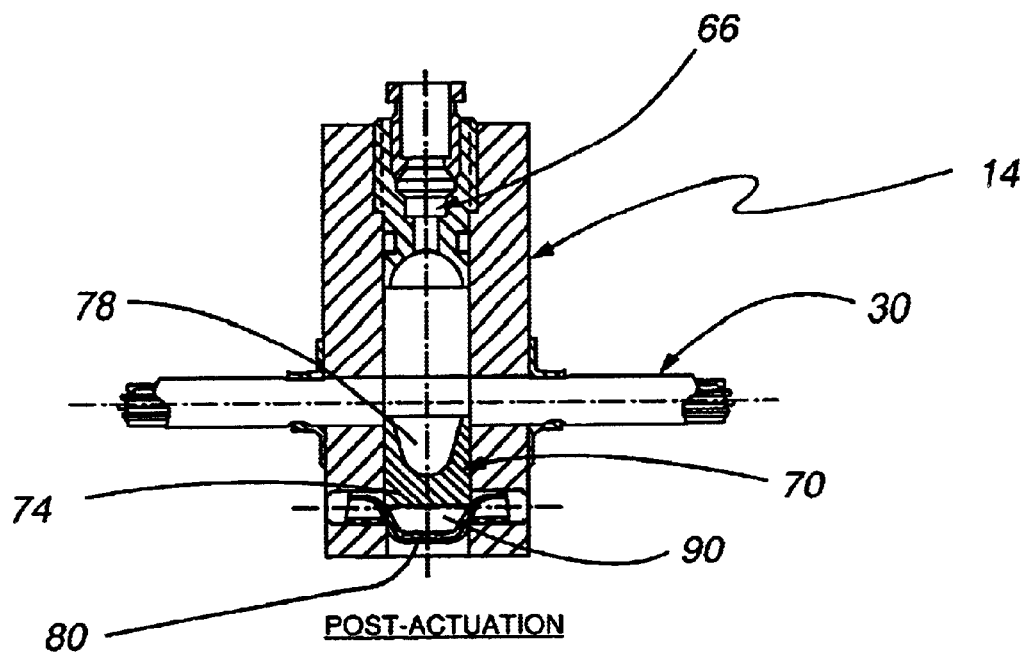
FIG. 7 is a longitudinal section illustrating the severing apparatus after it has been activated and a severed cable segment results from the severing element cutting the battery cable.

With reference to FIGS. 6 and 7, operation of severing apparatus 10 of FIGS. 1–4 is next described. In FIG. 6, one embodiment of the severing apparatus 10 is illustrated and which includes the initiator 66. The severing element 70 or piston is also located in the longitudinal bore 18 of the housing 14. The severing element 70 has an outer surface that is in contact with or closely adjacent to the section of the battery cable 30 located in the longitudinal bore 18. When the initiator 66 is activated, the initiator charge fires creating a force that is applied to the severing element 70. This force causes the severing element 70 to move along the longitudinal bore 18 through the battery cable section in the longitudinal bore 18. This action causes this section of the battery cable 30 to be sheared, or otherwise severed, from opposite sections of the battery cable that extend from opposing ends of the lateral bore. As seen in FIG. 7 for this embodiment, the severing element 70 has continued to move in the longitudinal bore 18 until its movement is stopped using the blocker 80. More specifically, the severed cable section or segment 90 is disposed in front of the outer surface of the severing element 70 and is pushed against the portions of the blocker 80 located in the longitudinal bore 18. When this occurs, the blocker 80 deforms or bends whereby the portions of the blocker 80 in the longitudinal bore 18 are caused to move in a direction towards the second end 26 of the housing 14. Preferably, before any portion of the blocker 80 would extend past the second end 26, the blocker 80 has absorbed the force or removed the energy from the moving severing element 70 and the accompanying severed cable segment. As can also be seen in FIG. 7, in accordance with this embodiment, some portions of the severing element 70 occupy some of the space that is in axial alignment with the remaining battery cable portions that extend from opposite ends of the lateral bore that contain such portions. Since the severing element 70, particularly body 74, is preferably made of a non-metallic material, the severing element 70 does not conduct and does not provide electrical continuity between the sections of the battery cable 30. Thus, upon severing of the cable segment 90 from opposing battery cable portions extending from the lateral bore, electrical continuity no longer exists in the battery cable and electrical power to the battery is removed or disabled. Alternatively, the severing element 70 could move a sufficient distance along the longitudinal bore 18 such that no portions thereof are axially aligned in a lateral direction with the battery cable portions that extend from opposite ends of the housing 14. The severing element 70 is shaped so that the propulsion pressure of the initiator 66 causes the end of the severing element 70 to extend sufficiently radially outward thereby effecting a dynamic seal against the longitudinal bore 18 and substantially prevent leakage of propulsive gases.

With regard to the embodiment of FIG. 5, the severing apparatus 100 functions similarly to the just described embodiment in that triggering of the initiator causes movement of the severing element 124 through the severed battery cable segment. The movement of the severing element 124 and the severed cable segment is halted by the blocker 140, which can also deform or bend due to the force applied to it based on the movement of the severing element 124 and the severed cable section. That is, the blocker 140, which is the end portions of the shell 128 in this embodiment, deforms and gradually stops such movement.

The foregoing discussion of the present invention has been presented for purposes of illustration and description. Furthermore, the description is not intended to limit the invention to the forms disclosed herein. Consequently, further variations and modifications commensurate with the above teachings within the skill and knowledge of the relevant art are within the scope of the present invention. The embodiments described hereinabove are further intended to explain the best mode presently known for practicing the invention and to enable others skilled in the art to utilize the invention in such, or in other, embodiments and with various modification(s) required by the particular application or use of the invention. It is intended that the appended claims be construed to include alternative embodiments to the extent permitted by the prior art.

What is claimed is:

1. A battery cable severing apparatus for locating in a vehicle, comprising:

a housing having a first end and a second end and adapted to receive portions of the battery cable;

an initiator having at least portions disposed in said housing;

a severing element having at least portions disposed in said housing, wherein when said initiator is activated, said severing element moves toward said second end; and a blocker that includes end portions of a container, said end portions become deformed end portions using said severing element when said initiator is activated, wherein said blocker is free of portions located outwardly of said deformed end portions after activation of said initiator such that the deformed end portions are visible from an exterior of said apparatus, and in which after activation of said initiator, said blocker deformed end portions remain part of said container and at least some of said blocker deformed end portions and said severing element are spaced from each other by at least some severed parts of the battery cable.

2. An apparatus, as claimed in claim 1, wherein:

said housing has a first bore and a second bore, said severing element moves in said first bore and said second bore is adapted to receive the portions of the battery cable.

3. An apparatus, as claimed in claim 2, wherein:

said second bore is a lateral bore and at least portions of said severing element are axially aligned with at least portions of said lateral bore after activation of said severing element.

4. An apparatus, as claimed in claim 1, wherein:

said blocker is a single part.

5. An apparatus, as claimed in claim 1, wherein:

said housing has a longitudinal extent and said container is located outwardly of at least a majority of said longitudinal extent of said housing.

6. An apparatus, as claimed in claim 1, wherein:

said deformed end portions of said blocker deform in a direction past said end portions of said container.

7. An apparatus, as claimed in claim 1, wherein:

at least said severing element has at least portions that are electrically insulative.

8. An apparatus, as claimed in claim 1, wherein:

said initiator includes a molded insert to prevent escape of said initiator from said housing after activation thereof.

* * * * *